US012141676B2

(12) United States Patent
Ge (10) Patent No.: US 12,141,676 B2
(45) Date of Patent: Nov. 12, 2024

(54) IMPLEMENTING HARDWARE NEURONS USING TUNNELING DEVICES

(71) Applicant: TETRAMEM INC., Newark, CA (US)

(72) Inventor: Ning Ge, Newark, CA (US)

(73) Assignee: TETRAMEM INC., Newark, CA (US)

( * ) Notice: Subject to any disclaimer, the term of this patent is extended or adjusted under 35 U.S.C. 154(b) by 1585 days.

(21) Appl. No.: 16/247,209

(22) Filed: Jan. 14, 2019

(65) Prior Publication Data

US 2020/0226447 A1 Jul. 16, 2020

(51) Int. Cl.
*G06N 3/045* (2023.01)
*G06N 3/08* (2023.01)

(52) U.S. Cl.
CPC ............... *G06N 3/045* (2023.01); *G06N 3/08* (2013.01)

(58) Field of Classification Search
CPC .. G06N 3/0454; G06N 3/0481; G06N 3/0635; G06N 3/08
See application file for complete search history.

(56) References Cited

U.S. PATENT DOCUMENTS

| | | | | |
|---|---|---|---|---|
| 10,127,494 B1* | 11/2018 | Cantin | ................. | G06N 3/0635 |
| 2004/0150010 A1* | 8/2004 | Snider | ................. | G11C 13/0014 |
| | | | | 257/209 |
| 2010/0217735 A1* | 8/2010 | Matsumura | ......... | H01L 51/0591 |
| | | | | 338/21 |
| 2012/0150781 A1* | 6/2012 | Arthur | ................... | G06N 3/049 |
| | | | | 706/15 |
| 2013/0325323 A1* | 12/2013 | Breed | ................ | G01C 21/3667 |
| | | | | 701/420 |
| 2016/0004959 A1* | 1/2016 | Nugent | .................. | G06N 3/063 |
| | | | | 706/26 |
| 2017/0017879 A1* | 1/2017 | Kataeva | .............. | G06F 11/0721 |
| 2018/0197077 A1* | 7/2018 | Brown | ................. | G06N 3/0635 |
| 2021/0019609 A1* | 1/2021 | Strukov | ............. | G11C 16/0416 |

OTHER PUBLICATIONS

Wikipedia, "Activation Function", https://en.wikipedia.org/wiki/Activation_function.*
Duan, S. et al., "Memristor-Based Cellular Nonlinear/Neural Network: Design, Analysis, and Applications" (Year: 2015).*
Mazumder, P. et al., "Tunneling-Based Cellular Nonlinear Network Architectures for Image Processing" (Year: 2009).*
Duan, S. et al., "Resonant Tunneling Diodes-Based Cellular Nonlinear Networks with Fault Tolerance Analysis" (Year: 2013).*
Wikipedia, "Activation Function", https://en.wikipedia.org/wiki/Activation_function (Year: 2022).*

(Continued)

*Primary Examiner* — Alexey Shmatov
*Assistant Examiner* — Devika S Maharaj
(74) *Attorney, Agent, or Firm* — Jaffery Watson Hamilton & DeSanctis LLP (57) ABSTRACT

Systems and methods for mitigating defects in a crossbar-based computing environment are disclosed. In some implementations, an apparatus comprises: a plurality of row wires; a plurality of column wires connecting between the plurality of row wires; a plurality of non-linear devices formed in each of a plurality of column wires configured to receive an input signal, wherein at least one of the non-linear device has a characteristic of activation function and at least one of the non-linear device has a characteristic of neuronal function.

10 Claims, 7 Drawing Sheets

(56) References Cited

OTHER PUBLICATIONS

Smagulova, K. et al., "A memristor-based long short term memory circuit" (Year: 2018).*
Pisarev, A. et al., "3D memory matrix based on a composite memristor-diode crossbar for a neuromorphic processor" (Year: 2018).*
Hasan, R. et al., "On-chip training of memristor crossbar based multi-layer neural networks" (Year: 2017).*
Pisarev, A. et al., "3D memory matrix based on a composite memristor-diode crossbar for a neuromorphic processor", https://www.sciencedirect.com/science/article/pii/S0167931718302260 (Year: 2018).*

* cited by examiner

IMPLEMENTING HARDWARE NEURONS USING TUNNELING DEVICES

TECHNICAL FIELD

The present disclosure generally to nonlinear tunneling devices and more specifically to implementing hardware neurons in an electric circuit using nonlinear tunneling devices.

BACKGROUND

Synapses and neurons are two fundamental components in an artificial neural network. Digital or software-based computing based on synapses and neurons have explored by many. However, analogous or hardware-based computing based on synapses and neurons are still under-developed. Therefore, a solution to design an electric circuit with devices to imitate the characteristic of the neural network remains a challenge.

SUMMARY

Apparatus of using nonlinear tunneling device in a circuit to perform neural network function are disclosed. In some implementations, an apparatus of performing neural network functions includes: a plurality of row wires; a plurality of column wires connecting between the plurality of row wires; a plurality of non-linear devices formed in each of a plurality of column wires configured to receive an input signal, wherein at least one of the non-linear devices has a characteristic of activation function and at least one of the non-linear device has a characteristic of neuronal function.

In some implementations, the characteristic of the neuronal function includes a sigmoid or a rectifying linear unit (ReLU).

In some implementations, the plurality of the non-linear tunneling devices is configured to be operated within a voltage of 5V.

In some implementations, a method of performing neural network functions includes: sending an electric circuit with a first input signal; and transmitting the first input signal through the electric circuit with a characteristic of activation function and a characteristic of neuronal function.

In some implementations, the characteristic of the neuronal function in the method includes a sigmoid or a rectifying linear unit (ReLU).

In some implementations, a non-transitory computer-readable storage medium storing one or more programs, the one or more programs includes instructions, which when executed by a computing system with one or more processors, cause the computing system to execute a method of: sending an electric circuit with a first input signal; and transmitting the first input signal through the electric circuit with a characteristic of activation function and a characteristic of neuronal function.

In some implementations, the characteristic of the neuronal function in the non-transitory computer readable storage medium includes a sigmoid or a rectifying linear unit (ReLU).

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

Technologies relating to implementing hardware neurons in an electric circuit using nonlinear tunneling are provided. These technologies may provide the following technical advantages. First, conventionally, the neurons are usually made of operational amplifiers and similar components which require large space on a computing chip. Using the non-linear tunneling device to replace the operational amplifiers may reduce the cost and the size of an electric circuit when implementing a neural network.

Second, when electric circuits are used to simulate an artificial neural network, the simpler the electric circuits are, the easier the electric circuits may be used in multiple applications. A non-linear tunneling device may be easily replaced if one or more devices are stocked or malfunction, the other devices may take the place of those malfunctioning ones. This is a more practical way to implement the neural function in an analog circuit as long as the redundant devices are sufficient and cheap enough.

Third, a non-linear tunneling device may be easily modified by coupling different non-linear tunneling device with the capacitor, which may be used to simulate different type of artificial neural functions or different input voltage range. The simulations may be carried out by adjusting pairing the capacitance and the characteristic of the non-linear tunneling device.

Figure 1:
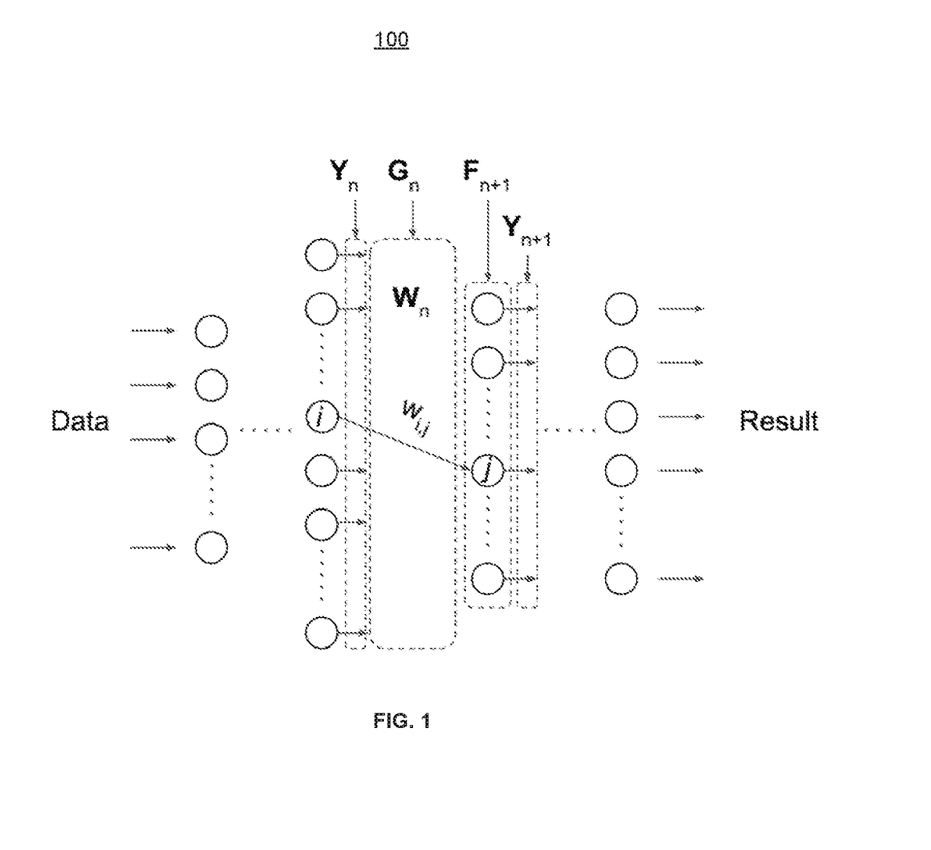
FIG. 1 is a block diagram illustrating an example neural network in accordance with some implementations.

FIG. 1 is a block diagram illustrating an example neural network 100. Neural networks, such as the neural network 100 shown in FIG. 1, usually contain multiple layers. In some implementations, data flow in from the left-most layer (e.g., the input layer), and the result comes out from the right-most layer (e.g., the output layer), where each layer may involve a computation similar to the following:

$$Yn+1=Fn(Gn(Wn,Yn))$$

Here, Yn represents the output matrix of the n-th layer, Wn represents the weight matrix of the n-th layer that wi,j represents the weight between the i-th output from the n-th layer and the j-th input to the (n+1)-th layer. Gn represents the function that describes how Yn calculates with Wn at the n-th layer: in fully connected layers, Gn may be a matrix product YnWn; and in convolution layers, Gn may be the convolution operation Yn*Wn. Fn represents the function that describes how the output of Gn is being processed at the n-th layer. A neural network's computation complexity may be dominated by G, because G involves large-scale matrix multiplications (convolution may be transformed into matrix multiplication as well).

Fn may be a linear function, such as when Fn=a*Gn+b or a nonlinear function, such as a Softmax function, a sigmoid, a Rectified Linear Unit (ReLU) function, a pooling function, and a batch normalization function. Fn may also be a combination of both a linear function and a nonlinear function. The present disclosure provides example implementations of a nonlinear Fn function. More complex Fn functions may be formed by connecting one or more circuit units implementing different or same Fn functions in serial or in parallel.

Figure 2A:
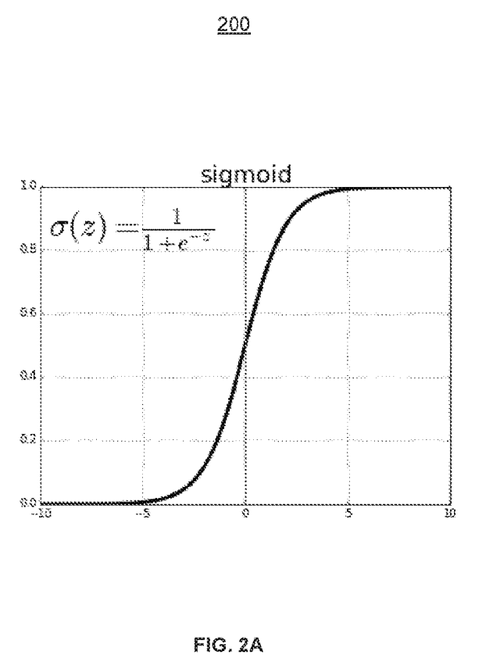
FIG. 2A is a block diagram illustrating a sigmoid profile in accordance with some implementations.
Figure 2B:
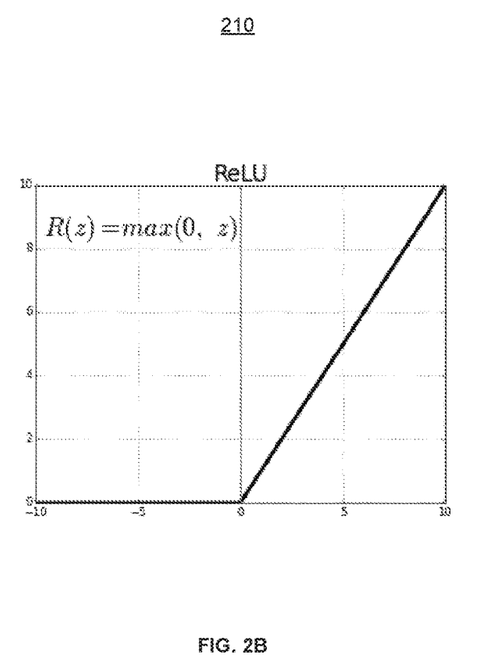
FIG. 2B is a block diagram illustrating a rectifying linear unit (ReLU) profile in accordance with some implementations.

Synapses and neurons are two components in an artificial neural network. Synapses are connections of different strength (or weight) in the network, and they are tunable during the training. Neurons receive signals, perform computation (weighted sum) on those signals, and send signals to the next layer according to a non-linear activation function, among which sigmoid (the characteristic diagram 200 is shown in FIG. 2A) and rectifying linear unit (ReLU) (the characteristic diagram 220 is shown in FIG. 2B) are widely used example. In state-of-the-art artificial neural networks, the neurons are usually made of operational amplifiers and similar components. These circuit components take up a great amount of space on a chip and consume a large amount of power. Therefore, in the present disclosure, a non-linear IV characteristic of a tunneling device to implement activation and neuronal functions is provided.

Figure 3:
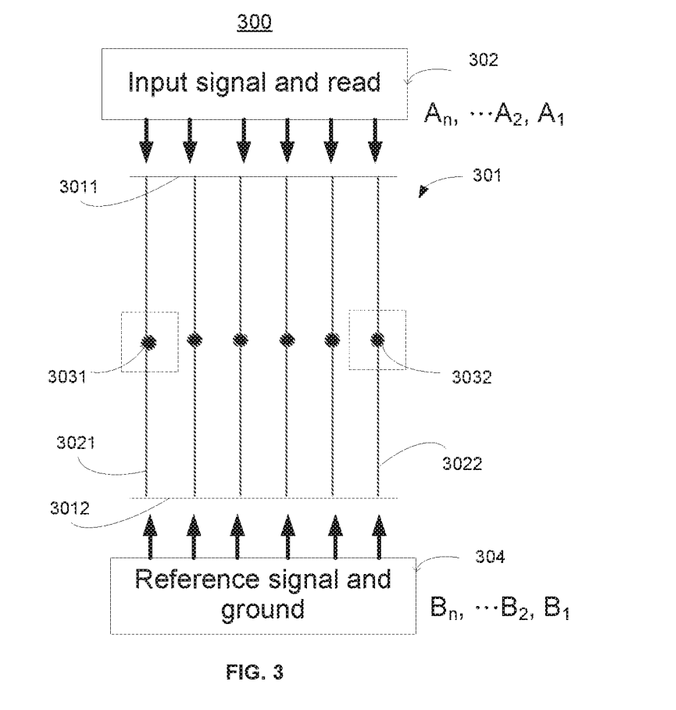
FIG. 3 is a block diagram illustrating an example electric circuit for implementing an artificial neural network in accordance with some implementations.

FIG. 3 shows an example diagram 300 of an electric circuit of an artificial neural network 301 in accordance with the embodiment of the present disclosure. As shown in FIG. 3, the electric circuit 301 includes a first row wire 3011, a second row wire 3012, a first column wire 3021, and a neural device 3031. In some implementations, the row wires (e.g. the first row wire 3011), the column wires (e.g. the first column wire 3021), or both, are metal wires.

When conducting a physical artificial neural network, first, when a programming signal or a reading signal 302 (e.g. a voltage matrix of A1, A2, ..., An) is applied to the neural device 3031, the neural device 3031 may perform an activation function or a neuronal function depending on it electric circuit. In some implementations, the neuronal function includes sigmoid (the characteristic diagram 200 is shown in FIG. 2A) and ReLU (the characteristic diagram 220 is shown in FIG. 2B). The current flow through the neural device 3031 and to the reference signal or the ground 304. Here are two example electric circuits of performing these functions.

1. Activation Function

Figure 4:
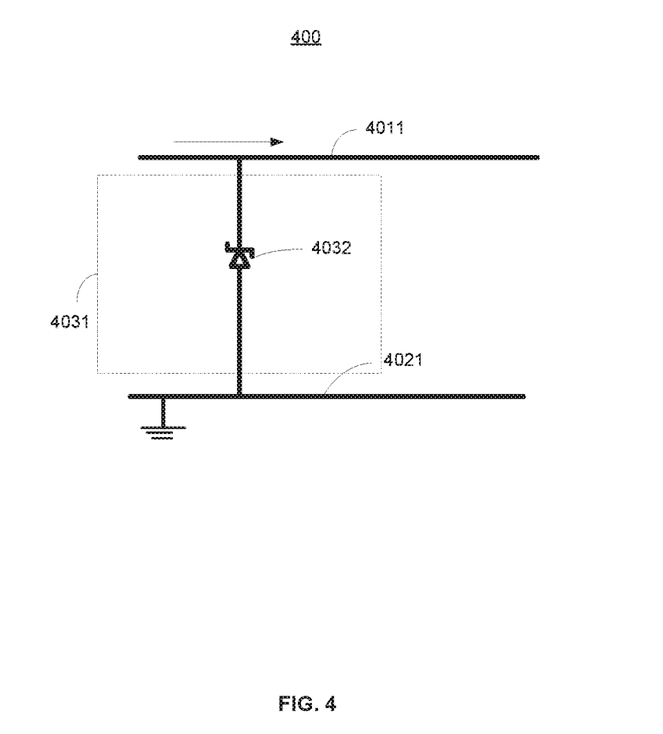
FIG. 4 is a block diagram illustrating a first example neural device in accordance with some implementations.

FIG. 4 is an example diagram 400 of the neural device 4031 in accordance with the embodiments of the present disclosure. As shown in FIG. 4, the neural device 4031 may include a non-linear tunneling device 4032 (e.g. a Zener diode) to be used for the activation function of a neuron. When reversely biased, the device 4032 will experience a "breakdown" process in which the current suddenly increases with a steep slope if the bias is beyond a threshold. The breakdown voltage of the non-linear tunneling device 4032 may be effectively tuned through doping of the pn junction, and may be very low (e.g. 1.2V). Therefore, the cost of implementing the neural function and the power consumption are both low. In some implementations, the non-linear tunneling device 4032 includes a Zener diode, a tunneling field effect transistor, or a nanogap device.

2. Neuronal Function

Figure 5:
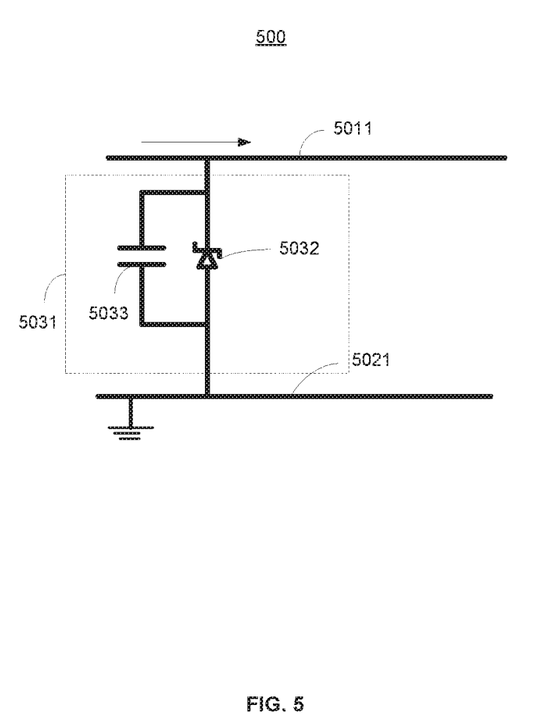
FIG. 5 is a block diagram illustrating a second example neural device pair in accordance with some implementations.

FIG. 5 is an example diagram 500 of the neural device pair 5031 in accordance with the embodiments of the present disclosure. As shown in FIG. 4, the neural device pair 5031 may include a non-linear tunneling device 5032 (e.g. a Zener diode) and a capacitor 5033 parallel to the non-linear tunneling device 5032 for the neuronal function of a neuron. When the non-linear tunneling device 5032 used together with the capacitor 5033, it will show integrate-and-fire behavior as a biological neuron. In this case, charges accumulate across the capacitor 5033, as a result, voltage across the capacitor 5033 increases until it reaches a threshold voltage to turn on the non-linear tunneling device 5032 (and discharge itself). The breakdown voltage of the non-linear tunneling device 5032 may be effectively tuned through doping of the pn junction, and may be very low (e.g. 1.2V). Therefore, the cost of implementing the neural function and the power consumption are both low. In some implementations, the non-linear tunneling device 5032 includes a Zener diode, a tunneling field effect transistor, or a nanogap device. In some implementations, the non-linear tunneling device pair 5031 may be operated within a voltage of 5V.

In some implementations, the electric circuit of an artificial neural network 301 includes both the activation function and the neuronal function. That is, the electric circuit 301 includes a plurality of row wire (e.g. the first row wire 3011 and the second row wire 3012), a plurality of column wires (e.g. the first column wire 3021, and the second column wire 3022), a activation function neural device 3031 (e.g. the neural device 4031 shown in FIG. 4), and a neuronal function neural device 3032 (e.g. the neural device pair 5031 shown in FIG. 5). Therefore, the electric circuit of the artificial neural network performing the function similar to a biological neuron may be achieved.

Figure 6:
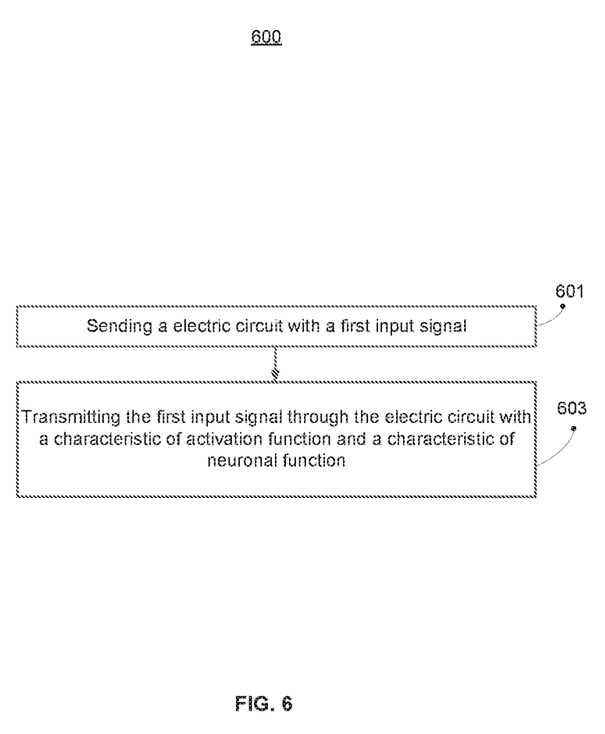
FIG. 6 is a flowchart illustrating an example method for implementing hardware neurons in an electric circuit using nonlinear tunneling devices in accordance with some implementations.

FIG. 6 is a flowchart illustrating an example method 600 for implementing an electric circuit of an artificial neural network in accordance with some implementations.

As shown in FIG. 6, the method 600 includes sending an electric circuit with a first input signal (step 601) and transmitting the first input signal through the electric circuit with a characteristic of activation function and a characteristic of neuronal function (step 603). In some implementations, the characteristic of the neuronal function includes a sigmoid or a rectifying linear unit (ReLU).

Figure 7:
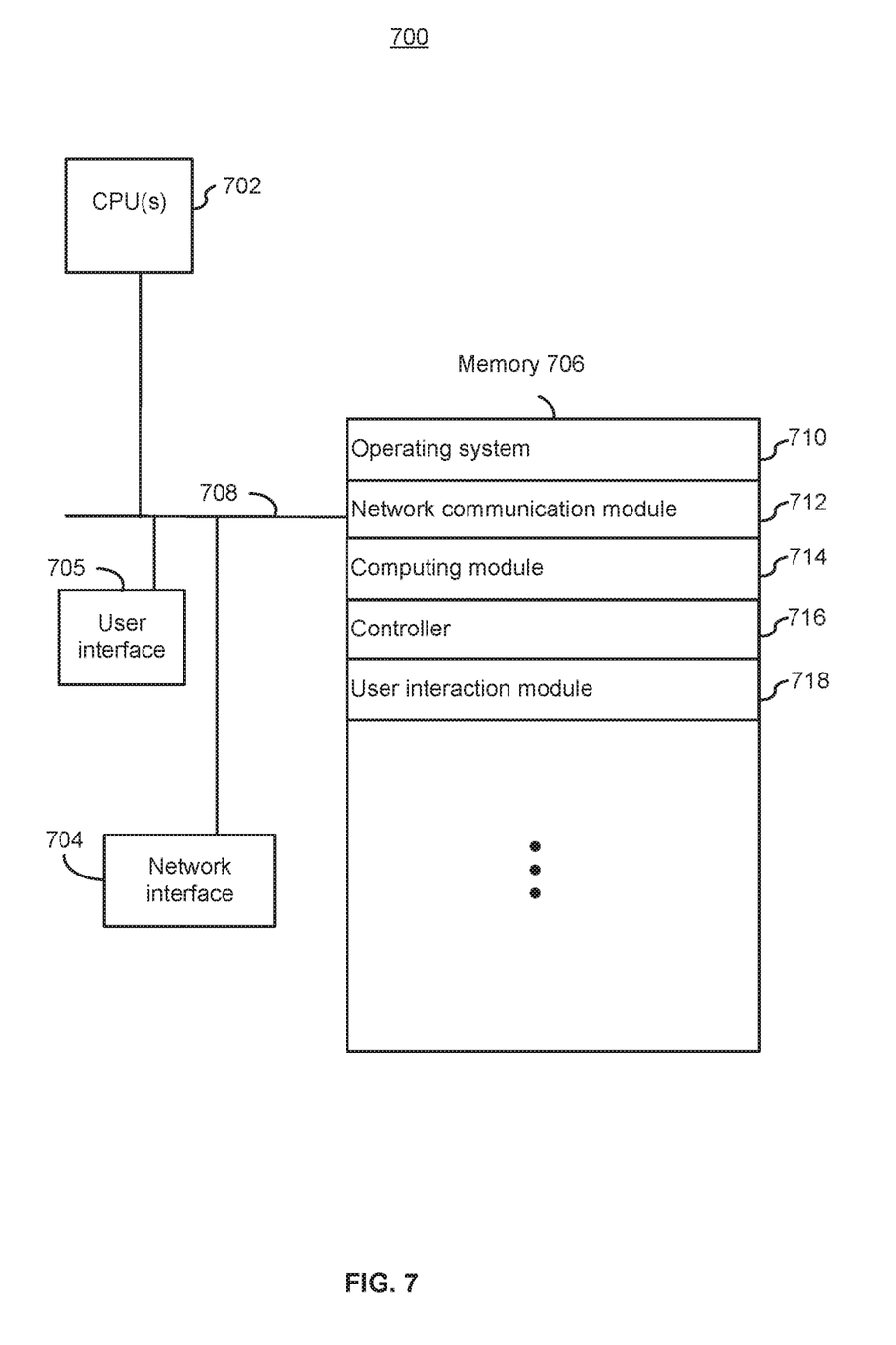
FIG. 7 is a block diagram illustrating an example computing system for implementing hardware neurons in an electric circuit using nonlinear tunneling devices in accordance with some implementations.

FIG. 7 is a block diagram illustrating an example computing system 700 for implementing hardware neurons in an electric circuit using nonlinear tunneling devices in accordance with some implementations. It should also be noted that this may also be implemented in a crossbar array in accordance with some implementations of the present disclosure.

The computer system 700 may be used to design or manufacture at least the crossbars, crossbar arrays, in-line arrays, or components thereof, shown with references to FIGS. 3-5. The computer system 700 in some implementations includes one or more processing units CPU(s) 702 (also referred to as processors 702), one or more network interfaces, optionally a user interface 705, a memory 706, and one or more communication buses 708 for interconnecting these components. The communication buses 708 optionally include circuitry (sometimes called a chipset) that interconnects and controls communications between system components. The memory 706 typically includes high-speed random access memory, such as DRAM, SRAM, DDR RAM or other random access solid state memory devices;

and optionally includes non-volatile memory, such as one or more magnetic disk storage devices, optical disk storage devices, flash memory devices, or other non-volatile solid state storage devices. The memory 706 optionally includes one or more storage devices remotely located from the processors 702. The memory 706, or alternatively the non-volatile memory device(s) within the memory 706, includes a non-transitory computer readable storage medium. In some implementations, the memory 706 or alternatively the non-transitory computer readable storage medium stores the following programs, modules, and data structures, or a subset thereof:

an operating system 710 (e.g., an embedded Linux operating system), which includes procedures for handling various basic system services and for performing hardware dependent tasks;

a network communication module 712 for connecting the computer system with a manufacturing machine via one or more network interfaces (wired or wireless);

a computing module 714 for executing programming instructions;

a controller 716 for controlling a manufacturing machine in accordance with the execution of programming instructions; and     a user interaction module 718 for enabling a user to interact with the computer system 700, for example, through the user interface 705.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first column could be termed a second column, and, similarly, a second column could be termed the first column, without changing the meaning of the description, so long as all occurrences of the "first column" are renamed consistently and all occurrences of the "second column" are renamed consistently. The first column and the second are columns both column s, but they are not the same column.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures, and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. An apparatus of performing neural network functions comprising:
    a plurality of row wires;
    a plurality of column wires connecting between the plurality of row wires; and
    a plurality of non-linear devices formed in each of the plurality of column wires configured to receive an input signal, wherein the plurality of non-linear devices comprises:
        a first neural device performing an activation function, wherein the first neural device comprises a first non-linear tunneling device connected to a first column wire of the plurality of column wires; and
        a second neural device performing a neuronal function, wherein the second neural device comprises a second non-linear tunneling device and a capacitor, wherein the capacitor is parallel to the second non-linear tunneling device, and wherein the second non-linear tunneling device and the capacitor perform the neuronal function when a second programming signal is applied to the second neural device through a second column wire of the plurality of column wires.

2. The apparatus as claimed in claim 1, wherein the neuronal function comprises a sigmoid or a rectifying linear unit (ReLU).

3. The apparatus as claimed in claim 1, wherein the plurality of non-linear devices is configured to be operated within a voltage of 5 V.

4. A method of performing neural network functions comprising:
- sending an electric circuit with an input signal, wherein the input signal comprises a voltage matrix;
- transmitting the input signal through a plurality of column wires of the electric circuit;
- performing an activation function on the input signal using a first neural device of the electric circuit; and
- performing a neuronal function on the input signal using a second neural device of the electric circuit, wherein the first neural device comprises a first non-linear tunneling device; wherein the second neural device comprises a second non-linear tunneling device and a capacitor, wherein the capacitor is parallel to the second non-linear tunneling device, and wherein the neuronal function is performed using the second non-linear tunneling device and the capacitor.

5. The method as claimed in claim 4, wherein the neuronal function comprises a sigmoid or a rectifying linear unit (ReLU).

6. A non-transitory computer-readable storage medium storing one or more programs, the one or more programs comprising instructions, which when executed by a computing system with one or more processors, cause the computing system to execute a method of:
- sending an electric circuit with an input signal comprising a voltage matrix;
- transmitting the input signal through the electric circuit;
- performing an activation function on the input signal using a first neural device of the electric circuit; and
- performing a neuronal function on the input signal using a second neural device of the electric circuit, wherein the first neural device comprises a first non-linear tunneling device; wherein the second neural device comprises a second non-linear tunneling device and a capacitor, wherein the capacitor is parallel to the second non-linear tunneling device, and wherein the neuronal function is performed using the second non-linear tunneling device and the capacitor.

7. The non-transitory computer-readable storage medium as claimed in claim 6, wherein the neuronal function comprises a sigmoid or a rectifying linear unit (ReLU).

8. The apparatus of claim 1, wherein the first non-linear tunneling device comprises at least one of a Zener diode, a tunneling field effect transistor, or a nanogap device.

9. The apparatus of claim 1, wherein the second non-linear tunneling device comprises at least one of a Zener diode, a tunneling field effect transistor, or a nanogap device.

10. The apparatus of claim 1, wherein, when the second programming signal is applied to the second neural device through the second column wire, charges accumulate across the capacitor, and the capacitor's voltage increases until it reaches a threshold voltage to turn on the second non-linear tunneling device.

\* \* \* \* \*